United States Patent [19]

Kiefer et al.

[11] 4,400,621
[45] Aug. 23, 1983

[54] DETECTOR DEVICE

[75] Inventors: Hans Kiefer, Eggenstein-Leop.;
Hans-Gerd Röber, Karlsruhe, both of Fed. Rep. of Germany

[73] Assignee: Kernforschungszentrum Karlsruhe GmbH, Karlsruhe, Fed. Rep. of Germany

[21] Appl. No.: 230,505

[22] Filed: Feb. 2, 1981

[30] Foreign Application Priority Data

Feb. 2, 1980 [DE] Fed. Rep. of Germany ....... 3003909

[51] Int. Cl.³ .............................................. G01T 1/18
[52] U.S. Cl. .................................... 250/385; 250/374
[58] Field of Search .............. 250/374, 375, 385, 388, 250/380

[56] References Cited

U.S. PATENT DOCUMENTS 2,957,084 10/1960 Marr et al. ........................ 250/380
4,075,486 2/1978 Sipilä et al. ...................... 250/374
4,277,682 7/1981 Madelaine et al. ................ 250/385

*Primary Examiner*—Bruce C. Anderson
*Attorney, Agent, or Firm*—Spencer & Kaye

[57] ABSTRACT

A device for simultaneously detecting alpha and beta particles which comprises a detector element, amplification means coupled to the output of the detector element and measuring means coupled to the output of the amplification means. The alpha and beta particles which impinge on the detector element exhibit different ionization densities, and this results in a voltage being generated at the output of the amplification means which has a rise time and amplitude corresponding to the type of particle impinging on the detector element. The measuring means measures at least the rise time of the voltage at the output of the amplification means, the rise time being different for the alpha and beta particles and providing a means for distinguishing between the two types of particles.

10 Claims, 3 Drawing Figures

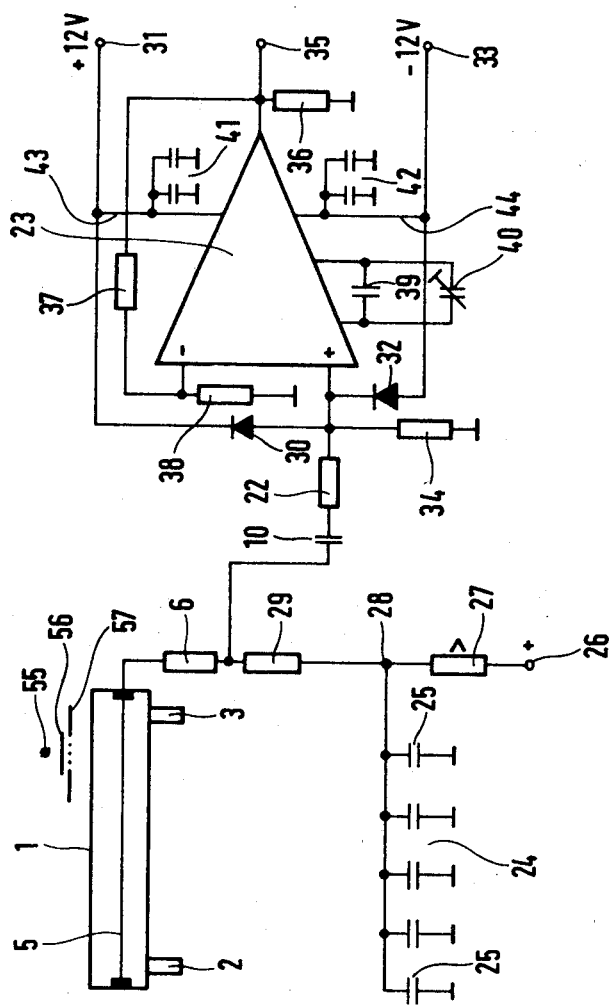

DETECTOR DEVICE

BACKGROUND OF THE INVENTION

This invention relates to a particle detector. More specifically, it relates to a device for simultaneously measuring alpha and/or beta particles with the same detector element.

Conventional detection devices for the measurement of alpha and beta particles employ, in addition to solids detectors, proportional counting tubes which generate pulses having heights proportional to the energy emitted by the particles. The separation between alpha and beta radiation is accomplished in these prior art devices by an energy analysis; that is, the separation process depends on the assumption that at a lower operating voltage only the alpha pulses exceed the counting threshold and at a higher operating voltage both alpha and beta pulses are measured. If two energy channels are provided, alpha and beta radiation can be detected simultaneously and separately. The same result can be realized by the use of a double counter if a separating foil is employed to assure that no alpha radiation enters the second counter.

The acuracy of these methods depends on the assumption that all alpha particles emit more energy than beta particles, or when a "mechanical" foil separation is employed, that the "reach" of all beta particles is greater than that of alpha particles. However, both requirements are met only in part and therefore lead to erroneous measurements.

For example, in large area counters, beta particles emit up to 200 keV of energy. Depending on the counting gas, alpha particles, which have already lost the majority of their energy due to absorption and self-absorption, emit the same amount of energy. Accordingly, under these conditions, alpha particles can not be distinguished from beta particles using the prior art energy analysis method. In practice, this means that a pure alpha radiator simulates an additional beta radiator and, depending on the operating voltage, a pure beta radiator may simulate an additional alpha radiator.

Depending on the operating voltage applied in a "mechanical" separation, the low-energy beta component, which is always present because of the continuous beta spectra, is lost or is recorded as alpha radiation. In difference measurements, alpha and beta particles cannot be distinguished if they both emit the same energy.

These basic errors become evident in measurements with proportional counting tubes and with solids and liquid detectors. The error occurs particularly with large counting tubes, when there is diffuse impingement of radiation and in certain counting gas mixtures such as $CH_4$ Since prior art detector devices, particularly those employing proportional counting tubes, cannot distinguish alpha particles from beta particles of the same energy if the alpha particles have lost energy before they entered the detector device, it is an object of the present invention to provide a device for detection of alpha and/or beta particles of any energy. That is, the invention is an improvement over prior art devices in which alpha particles which have lost energy within the radiation source cannot be detected or distinguished from beta particles.

SUMMARY OF THE INVENTION

In accordance with the present invention, a device is provided for simultaneously detecting alpha and beta particles which comprises a detector element, amplification means coupled to the output of the detector element and measuring means coupled to the output of the amplification means. The alpha and beta particles which impinge on the detector element exhibit different ionization densities, and this results in a voltage being generated at the output of the amplification means which has a rise time and amplitude corresponding to the type of particle impinging on the detector element. The measuring means measures at least the rise time of the voltage at the output of the amplification means, the rise time being different for the alpha and beta particles and providing a means for distinguishing between the two types of particles.

The present invention utilizes the ionization density rather than the emitted energy for separation of alpha from beta rays, the ionization density being different for alpha and beta radiation. The ionization density manifests itself in the pulse shape at the output of the amplification means making it possible to effectively separate alpha and beta radiations.

The advantage of such a separation is that the measurements are correct, and that with simultaneous measurement of alpha and beta particles, shorter measuring times or a higher statistical accuracy can be realized. Further, with the use of control radiators during the measurements of alpha and beta radiation, the reliability of the measurements can be increased. Also, this type of alpha/beta discrimination provides a higher time resolution capability.

BRIEF DESCRIPTION OF THE DRAWINGS

FIG. 2 is a detailed schematic diagram of an embodiment of the invention;

FIG. 3 is a voltage-time curve showing the output of the apparatus depicted in FIG. 2.

DESCRIPTION OF THE PREFERRED EMBODIMENT

Figure 1:
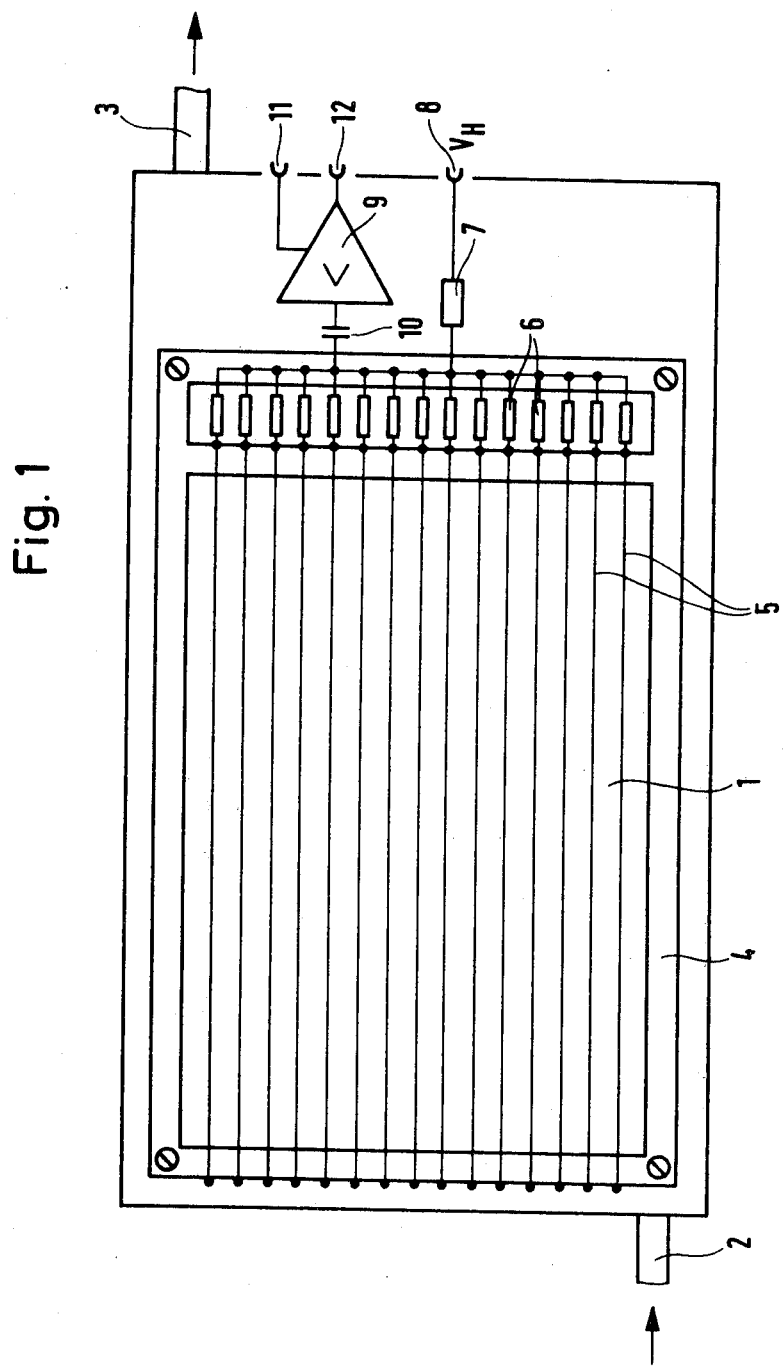
FIG. 1 is a schematic diagram of the invention showing a large area counter.

Referring to FIG. 1, there is shown a top schematic view of a large area proportional counting tube 1 having a counting gas inlet 2 and an outlet 3. A typical gas which can be used in the counter tube is $CH_4$ with a pressure of approximately 30 mb above atmospheric pressure.

An insulating frame 4 consisting of individual, mutually parallel tensioned wires 5 made of molybdenum with a diameter of 0.03 mm. are disposed within the tube 1, one end of each of the wires 5 being connected through a resistor 6 to one terminal of a common resistor 7. In a typical application, each of the resistors 6 has a value of 10,000 ohms and resistor 7 has a value of 1000 ohms. The other terminal of resistor 7 is connected to a terminal 8 for coupling to a high voltage source $V_H$ having a magnitude on the order of 6000 volts.

An amplifier 9 has an input coupled through a capacitor 10 to the junction of resistor 7 and resistors 6, capacitor 10 having a capacitance of 100 pF and a voltage rating of 6000 volts. Power for operation of amplifier 9 is provided by a current supply connected to a terminal 11. An output voltage pulse is obtained at output terminal 12 when particles impinge on the wires 5 of counter tube 1.

The resistor 7 and amplifier 9 may be integrated with the detector element or directly attached thereto in order to minimize the effect of capacitances which could influence the rise time of the output pulse at terminal 12. The capacitances of the individual wires 5 with respect to the mass potential must be kept as low as possible (preferably substantially below 20 pF) so as not to flatten the rise times of the alpha particle pulses. A plurality of counting wires can be combined as long as this condition is met.

A detailed schematic diagram of another embodiment of the invention is shown in FIG. 2. In this embodiment, a counting wire 5 is coupled through the 10,000 ohm resistor 6, the 100 pF signal coupling capacitor 10 and a 1000 ohm resistor 22 to the positive input of an operational amplifier 23. In a typical embodiment of the invention, the capacitance $C_z$ between the wire 5 of the counting tube 1 and ground is about 7 pF.

A capacitor bank 24 consisting of parallel capacitors 25 is charged (with a time constant of >1 ms for the rise of the high voltage $V_H$ at junction 28) through a resistor 27 having a value in excess of 100,000 ohms to approximately 6000 volts with respect to ground by a positive voltage source connected to a terminal 26. The junction 28 between the ungrounded end of capacitor bank 24 and resistor 27 is connected through a 470 ohm resistor 29 to the junction of resistor 6 and capacitor 10. The voltage at the junction 28 has a delayed rise time in order to protect the amplifier 23, the amplifier 23 being typically a type LH 0032 CG manufactured by "National Semiconductors." Resistors 6 and 29 form a potentiometer.

This amplifier has the ability to process pulses having a rise time of less than 50 ns.

Current is supplied to the positive input of amplifier 23 through a Schottky diode 30 by a positive 12 volt source connected to a terminal 31, the diode 30 being poled to conduct current from the amplifier input toward terminal 31. Similarly, current is supplied to the positive input of amplifier 23 through a Schottky diode 32 by a negative 12 volt source connected to a terminal 33, the diode 32 being poled to conduct current from terminal 33 toward the positive input terminal of the amplifier. Resistance 22 and diodes 30,32 form a clamping circuit to protect the amplifier 23. A 10,000 ohm resistor 34 is connected between the positive input terminal of amplifier 23 and ground.

The output of amplifier 23 is coupled to an output terminal 35, to ground through a 1000 ohm resistor 36 and to the negative input terminal of the amplifier through a 10,000 ohm resistor 37. A 1000 ohm resistor 38 connects the negative input terminal of amplifier 23 to ground. Resistors 37,38 adjust the amplification of the amplifier 23. Frequency compensation is obtained by a 5 pF fixed capacitor 39 connected to amplifier 23 in parallel with a variable capacitor 40 having an adjustable range between 1 and 5 pF Capacitances 41 and 42 are coupled between terminals 31 and 33 respectively and ground to protect the amplifier 23 from the 12 volt sources, terminal 31 and 33 being connected to amplifier 23 via leads 43 and 44 respectively in order to couple the respective +12 volt and −12 volt sources to the amplifier.

The operation of the circuit is as follows. Due to their different ion densities, the α- and β-particles generate pulses with different pulse rise times in the detector 1 shown in FIGS. 1 and 2. The relatively short rise times of the pulses can only be resolved by a special detector arrangement with appropriate electronic properties, with the time constant of detector 1 during the ionization process being of prime importance. This constant has to be equal to or less than the shortest rise time to be resolved of the pulses generated. This time constant $T_D$ of the detector 1 is determined primarily by two factors: (1) the internal resistance $R_{iD}$ during the ionization process, and (2) the detector capacity $C_D$ between counting wire 5 and the casing of detector 1. These two characteristic values, it can be stated in a simplified way, determine the internal time constant $T_D$ the detector 1 by the relationship.

$$T_D \approx R_{iD} \cdot C_D$$

This relation shows that short pulse rise times can only be obtained with a relatively low detector capacity $C_D$.

FIG. 2 shows the measuring arrangement in which the detector 1 with only one counting wire 5 is used ($C_D = 7$ pF). The different rise times of α- and β-pulses can be observed on the output 35 of the measuring arrangement with the aid of an oscilloscope (Tektronix Typ 547). FIG. 1 presents the design of a large-area detector with a counting grid of 26 wires. Each wire 5 has a capacity of about 2 pF against the detector casing. All detector elements 5, 6 are connected to a common coupling load resistance 7 (220Ω) via 26 collecting load resistances 6 (10 kΩ). Sufficient electronic decoupling of the individual detector elements 5, 6 is assured by a resistance ratio of the resistances 6, 7 of 45:1. In this type of detector, a high voltage $V_H$ of 3800 V is required in the socket 8.

The pre-amplifier 9 is designed so that even pulse rise times of 10 ns can be transmitted at a maximum amplitude of about 10 $V_s$. During injection of α- and β-particles in the detector 1, the curves 52 (FIG. 3) can be observed at the output 12 of the amplifier 9 with the aid of the oscilloscope.

Typical voltages at the output terminal 35 of amplifier 23 are shown graphically in FIG. 3 which is a plot of voltage in volts against time in nanoseconds, each division on the time axis being equal to 100 ns and each division of the voltage axis being equal to one volt. The crosshatched area bounded by envelope 50 sharply defines the voltage-time region produced by beta particles. The voltage amplitudes generated by the beta particles is in the range 1 to 300 mV and the rise time of the envelope 50 from zero to its maximum value is approximately 100 ns.

The areas bounded by curves 52, on the other hand, show the amplitude spectrum of various alpha particles having different energy losses before entering the detector device 1. The rise times of the envelopes 52 generated by the alpha particles from zero to a maximum voltage value are on the order of 50 ns, and it is this difference in rise time which permits the apparatus to distinguish between alpha and beta particles.

The reliability of the measurements can be further increased by the use of control radiators. Referring to FIG. 2.

By means of a control radiation source 55 with a movable disk 56 of a diaphragm 57, the optimum separation of the α- and β-measuring channels can be controlled during measurement of α- or β-particles. For example, a β-control-radiation-source can be measured at the same time as the α-radiation. With correct adjustment of the α-β-discrimination, no β-impulse should enter the α-measuring channel.

It will be understood that the above description of the present invention is susceptible to various modifications, changes and adaptations, and the same are intended to be comprehended within the meaning and range of equivalents of the appended claims.

What is claimed:

1. A device for simultaneously detecting alpha and beta particles comprising
    a detector element for detecting both alpha and beta particles impinging thereon, said alpha and beta particles exhibiting different ionization densities; and
    amplification means coupled to the output of said detector element, said amplification means generating a voltage at its output having a rise time and amplitude corresponding to the type of particle impinging on said detector element, said rise time being different for said alpha and beta particles and providing a means for distinguishing therebetween.

2. A device as defined in claim 1 wherein said detector element is a proportional counting tube.

3. A device as defined in claim 1 or 2 wherein said detector element is a large area counting tube having at least one counting wire.

4. A device as defined in claim 3 wherein the capacitance of said counting wire is less than 20 pF.

5. A device as defined in claim 1 or 2 which further comprises at least one control radiator adjacent said detector element, said control radiator including a radiation source and an adjustable diaphragm interposed between said radiation source and said detector element.

6. A device as defined in claim 3 which further comprises at least one control radiator adjacent said counting tube, said control radiator including a radiation source and an adjustable diaphragm interposed between said radiation source and said counting tube.

7. A device for simultaneously detecting alpha and beta particles comprising
    a proportional counting tube comprising a plurality of parallel wires connected together at one end for detecting both alpha and beta particles impinging thereon, said alpha and beta particles exhibiting different ionization densities;
    a high voltage source;
    an operational amplifier having a first input coupled to said one end of the plurality of wires comprising said counting tube and to said high voltage source, said amplifier generating a voltage at its output having a rise time corresponding to the type of particle impinging on said counting tube; and
    measuring means coupled to the output of said amplifier for measuring the rise time of the voltage at the output of said amplifier, said rise time being different for said alpha and beta particles and providing a means for distinguishing therebetween.

8. A device as defined in claim 7 wherein the first input of said amplifier is coupled to positive and negative voltage sources through first and second diodes respectively, said first diode being poled to permit flow of current away from the first input of said amplifier and said second diode being poled to permit flow of current toward the first input of said amplifier.

9. A device as defined in claim 7 or 8 wherein the output of said amplifier is coupled to a second input thereof.

10. A device as defined in claim 7 or 8 which further comprises a resistor connected in series with each of said plurality of parallel wires comprising said counting tube.

* * * * *